US011864536B2

(12) United States Patent
Yao et al.

(10) Patent No.: US 11,864,536 B2
(45) Date of Patent: Jan. 9, 2024

(54) STATE-SPECIFIC AQUACULTURE FEEDER CONTROLLER

(71) Applicant: X Development LLC, Mountain View, CA (US)

(72) Inventors: Zhaoying Yao, Palo Alto, CA (US); Barnaby John James, Los Gatos, CA (US)

(73) Assignee: X Development LLC, Mountain View, CA (US)

( * ) Notice: Subject to any disclaimer, the term of this patent is extended or adjusted under 35 U.S.C. 154(b) by 74 days.

(21) Appl. No.: 17/320,520

(22) Filed: May 14, 2021

(65) Prior Publication Data
US 2022/0361459 A1 Nov. 17, 2022

(51) Int. Cl.
*A01K 61/80* (2017.01)
*A01K 61/10* (2017.01)

(52) U.S. Cl.
CPC .............. *A01K 61/80* (2017.01); *A01K 61/10* (2017.01)

(58) Field of Classification Search
CPC ................................ A01K 61/80; A01K 61/10
See application file for complete search history.

(56) References Cited

U.S. PATENT DOCUMENTS

| | | | | |
|---|---|---|---|---|
| 3,231,314 A * | 1/1966 | Cook | ..................... | A01K 61/80 406/123 |
| 4,492,182 A * | 1/1985 | Wensman | ....... | B01F 35/714112 119/230 |
| 5,791,285 A * | 8/1998 | Johnson | .................. | A01K 61/85 119/51.04 |
| 5,957,085 A * | 9/1999 | Youngstrom | ........ | A01K 63/006 119/51.04 |
| 6,192,830 B1 * | 2/2001 | Lin | ......................... | A01K 61/80 119/51.04 |
| 9,326,493 B2 | 5/2016 | Han et al. | | |
| 10,856,520 B1 | 12/2020 | Kozachenok et al. | | |
| 2005/0028439 A1 | 12/2005 | Lindgren | | |

(Continued)

FOREIGN PATENT DOCUMENTS

| | | |
|---|---|---|
| CL | 2019000039 A1 | 3/2019 |
| CN | 102550466 | 7/2012 |

(Continued)

OTHER PUBLICATIONS

Extended Search Report in European Appln. No. 22151132.2, dated May 2, 2022, 10 pages.

(Continued)

*Primary Examiner* — Peter M Poon
*Assistant Examiner* — Shada Mohamed Alghailani
(74) *Attorney, Agent, or Firm* — Fish & Richardson P.C.

(57) ABSTRACT

Methods, systems, and apparatus, including computer programs encoded on computer-storage media, for controlling an aquaculture feeding system are described. In some implementations, a method includes determining, using a feeding system controller, that a feeding system has transitioned from a first state to a second state, and based on the transition from the first to the second state providing, using the feeding system controller, instructions to a dosing system to set a feed rate of the dosing system, and providing, using the feeding system controller, instructions to a blower operatively coupled to the dosing system to set a flow rate of the blower.

15 Claims, 6 Drawing Sheets

(56) References Cited

U.S. PATENT DOCUMENTS

| | | | | |
|---|---|---|---|---|
| 2017/0150701 | A1* | 6/2017 | Gilmore | A01K 29/005 |
| 2017/0325427 | A1* | 11/2017 | Straight | A01K 63/065 |
| 2019/0228218 | A1 | 7/2019 | Barnaby et al. | |
| 2019/0340440 | A1 | 11/2019 | Atwater et al. | |
| 2020/0107524 | A1 | 4/2020 | Messana et al. | |
| 2020/0155882 | A1 | 5/2020 | Tohidi et al. | |
| 2020/0288678 | A1 | 9/2020 | Howe et al. | |
| 2021/0321593 | A1* | 10/2021 | Ma | G06V 40/23 |

FOREIGN PATENT DOCUMENTS

| | | |
|---|---|---|
| CN | 10711429 | 9/2017 |
| CN | 108040948 | 5/2018 |
| EP | 2244934 | 11/2010 |
| EP | 3484283 | 5/2019 |
| JP | 2002171853 | 6/2002 |
| KR | 101493963 | 2/2015 |
| KR | 20200109155 A * | 11/2020 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO2017137896 | 8/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2022029471 A1 * | 8/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvyak et al., "Robust Re-identification of Manta Rays from Natural Markings by Learning Pose Invariant Embeddings," CoRR, Feb. 2019, arXiv:1902.10847v1, 12 pages.

PCT International Search Report and Written Opinion in International Appln. No. PCT/US2020/059829, dated Feb. 25, 2021, 18 pages.

Qiu et al., "Improving Transfer Learning and Squeeze-and-Excitation Networks for Small-Scale Fine-Grained Fish Image Classification," IEEE Access, Dec. 2018, 6(31):78503-78512.

Stein et al., "Consistent melanophore spot patterns allow long-term individual recognition of Atlantic salmon Salmo Salar," Journal of Fish Biology, Nov. 2017, 91(6):1699-1712.

Maloy et al., "A spatio-temporal recurrent network for salmon feeding action recognition from underwater videos in aquaculture," Computers and Electronics in Agriculture, Nov. 12, 2019, 9 pages.

Odey, "AquaMesh—Design and Implementation of Smart Wireless Mesh Sensor Networks for Aquaculture," American Journal of Networks and Communications, Jul. 2013, 8 pages.

Petrov et al., "Overview of the application of computer vision technology in fish farming." E3S Web of Conferences, 2020, 175:02015.

Saberloon et al., "Application of Machine Vision Systems in Aquaculture with Emphasis on Fish: State-of-the-Art and Key Issues," Reviews in Aquaculture, Dec. 2017, 9:369-387.

towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

* cited by examiner

STATE-SPECIFIC AQUACULTURE FEEDER CONTROLLER

FIELD

This specification relates to a feeder controller for aquaculture feeding systems.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fish ponds, or ocean enclosures. Farming aquaculture livestock typically requires that the livestock be fed while the livestock grows. For example, salmon being farmed may be fed for three to seven hours a day until the salmon are large enough to be harvested. An automated feeding system can be used to feed the livestock predetermined quantities of food according to a fixed schedule. Interruptions in the feeding quantities and schedule can affect the growth rate of the farmed fish.

SUMMARY

In general, innovative aspects of the subject matter described in this specification relate to controlling an aquaculture feeding system.

A system that provides automated control of an aquaculture feeding system may improve compliance with a feeding protocol that ensures livestock growth. For example, the automated control may ensure that the feeding system successfully completes feeding cycles scheduled throughout the day. More specifically, the automated control may reduce the likelihood of disruptions to feeding cycles. If disruptions to the feeding cycles do arise, the automated control may quickly detect the disruption and initiate actions that minimize equipment damage and feed waste in the feeding system.

One innovative aspect of the subject matter described in this specification is embodied in a method that includes determining, using a feeding system controller, that a feeding system has transitioned from a first state to a second state, and based on the transition from the first to the second state providing, using the feeding system controller, instructions to a dosing system to set a feed rate of the dosing system, and providing, using the feeding system controller, instructions to a blower operatively coupled to the dosing system to set a flow rate of the blower.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. Determining that the feeding system has transitioned from the first state to the second state may include receiving information over a network that indicates the transition. In some instances, the first state may be an idle state and the second state may be a feeding state, and providing instructions to the dosing system to set the feed rate of the dosing system may include setting the feed rate to zero over a period of time, and providing instructions to the blower to set the flow rate of the blower may include setting the flow rate to a non-zero value over the same period of time. In some instances, the first state may be a feeding state and the second state may be an idle state, and providing instructions to the dosing system to set the feed rate of the dosing system may include tapering the feed rate to zero over a period of time, and providing instructions to the blower to set the flow rate of the blower may include maintaining the flow rate at a non-zero value over the same period of time.

Determining that the feeding system has transitioned from the first state to the second state may include detecting a change in backpressure at one end of a feed pipe that is connected at its opposite end to the blower. In some instances, the backpressure may be detected based on information indicating a power consumption of the blower.

Detecting a change in backpressure may include determining a confidence interval relative to a predetermined backpressure value, determining an upper limit and a lower limit for the backpressure based on the confidence interval, and comparing a detected backpressure value to the upper limit or the lower limit.

In some instances, the method can include providing instructions to the dosing system to set the feed rate of the dosing system to zero and providing instructions to the blower to set the flow rate of the blower to zero in response to detecting an increase in backpressure. In some instances, the method can include providing instructions to the dosing system to set the feed rate of the dosing system to zero in response to detecting a decrease in backpressure.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
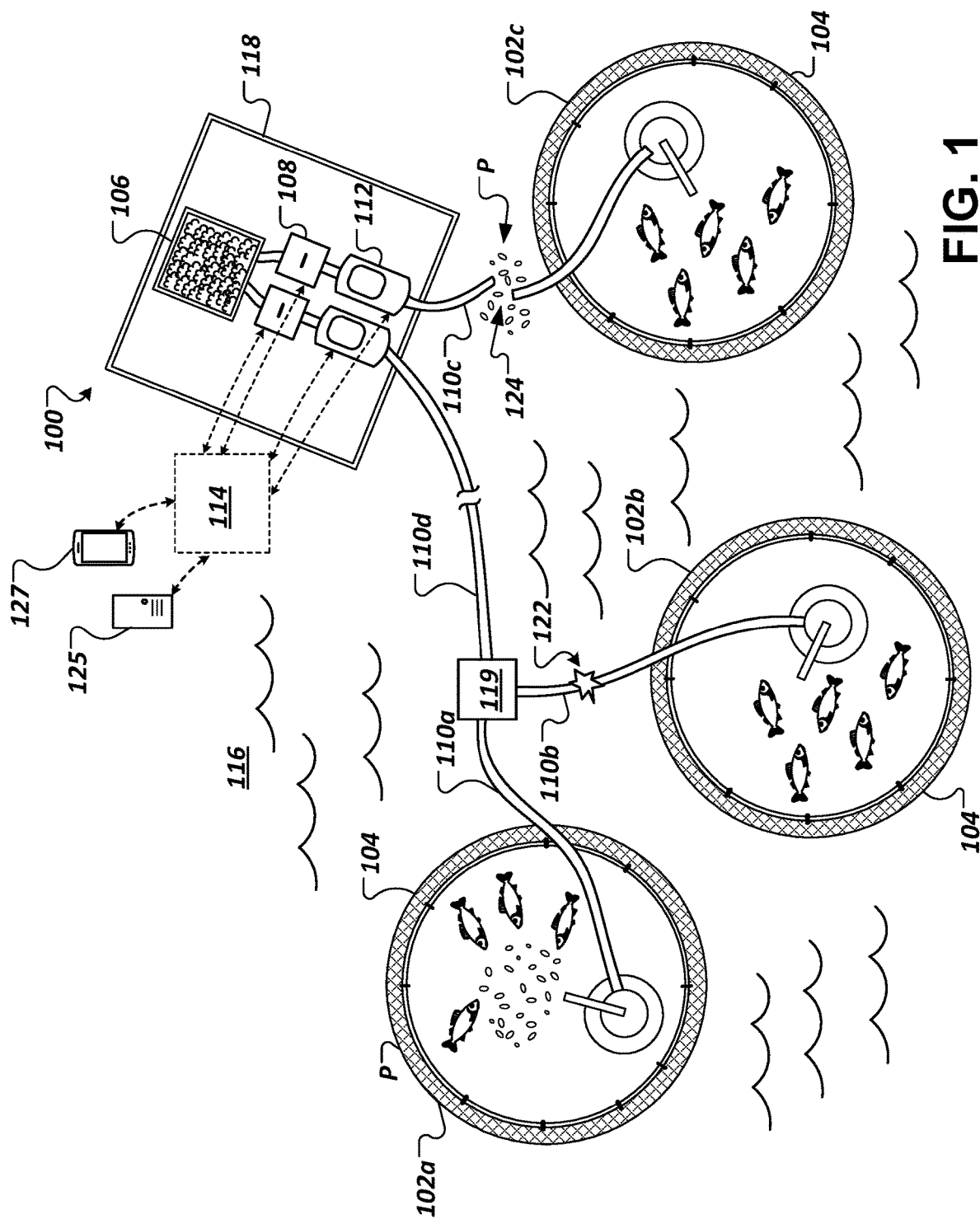
FIG. 1 depicts an example feeding system and enclosures that each contain aquatic livestock from above.

FIG. 1 depicts an example feeding system 100 and enclosures 102*a*-102*c* that each contain aquatic livestock from above. The livestock 104 can be aquatic creatures, such as fish that swim freely within the confines of the enclosure 102*a*-102*c*. In some implementations, the aquatic livestock 104 held within the enclosures 102*a*-102*c* can include finfish or other aquatic lifeforms. The livestock 104 can include for example, juvenile fish, koi fish, sharks, salmon, and bass, to name a few examples. In addition to the aquatic livestock, each enclosure 102a-102c contains water, e.g., seawater, freshwater, or rainwater, although the enclosure can contain any fluid that is capable of sustaining a habitable environment for the aquatic livestock.

The feeding system 100 includes feed storage 106, a dosing system 108, feed pipes 110a-110d that are connected to the respective enclosures 102a-102c, one or more blowers 112, and a controller 114. The feeding system 100 can be used to feed aquatic livestock 104 according to a feeding protocol or schedule. In order to feed the livestock 104, the controller 114 instructs the dosing system 108 to transfer a quantity of feed from the feed storage 106 to a respective feed pipe 110a-110d. The controller 114 then instructs the blower 112 to blow air along the feed pipe 110a-110d to convey the feed along the pipe 110a-110d and to the enclosure 102a-102c.

Farmed fish can be fed dried pellets of food that are specially adapted to the nutritional needs of each species of fish. The feed storage 106 can be a silo or container that holds a large quantity of such feed pellets. In automated systems, the silo often has an opening at the bottom that connects to the dosing system 108. The dosing system 108 loads the pellets into the feed pipes 110a-110d by weight or volume. For example, the dosing system 108 can include an auger screw. The blowers 112 are connected to the feed pipes 110a-110d and pressurize air that moves the pellets along the feed pipes 110a-110d. The controller 114 can be a programmable logic controller (PLC) that controls, e.g., a feed rate of the dosing system 108 and a flow rate of the blowers 112 based on input variables as described below in more detail. The controller 114 can be communicatively coupled to one or more of a server 125 and a user device 127 via a wireless network.

The enclosures 102a-102c can be large circular pens that have a diameter of approximately 40 meters (131.2 feet), for example. The pens are arranged in a large body of water 116, such as the ocean, and connected to a feeding barge 118 by the feed pipes 110a-110d. The total length of the feed pipes 110a-110d can range from, e.g., 500 to 1000 meters (1640 to 3281 feet). In some cases, a selector or switch 119 is used to connect multiple enclosures to a common blower 112 or section of feed pipe 110d. Although the switch 119 is schematically depicted between the feed barge 118 and the enclosures 102a, 102b in FIG. 1, the switch 119 can also be located on the feed barge 118.

A first enclosure 102a includes a spreader 120 that is connected to the end of a first feed pipe 110a. The spreader 120 distributes a cloud of pellets P that traveled through the feed pipes 110a, 110d within the first enclosure 102a. The livestock 104 are shown feeding on the pellets P. The first enclosure 102a shows the components of the feeding system 100 working as intended.

A second enclosure 102b is connected to the feeding system 100 by a second feed pipe 110b that has a blockage or clog 122 along the length of the second feed pipe 110b. In some cases, the feed pellets can include fish oil or other ingredients that sticks to the inner walls of the feed pipes 110a-110d, which can have a small cross-sectional area relative to their length. For example, the feed pipes 110a-110d can have an outer diameter that ranges from 20 to 150 mm (0.8 to 5.9 inches) and a length of over 3000 feet. The feed pipes 110a-110d are especially prone to clogging when the temperature increases. A clog 122 in the feed pipe 110b can prevent some or all of the intended feed from reaching the second enclosure 102b. If the clog 122 is not quickly detected and remedied, the livestock 104 may miss one or more feeding cycles, disrupting the livestock's growth. In some cases, a clog 122 in the feed pipe 110b may also cause damage to the equipment of the feeding system 100.

A third enclosure 102c is connected to the feeding system 100 by a third feed pipe 110c. In some implementations, the feed pipe 110c includes two or more joined sections of flexible tubing that floats on the surface of the water 116. For example, the tubing can be made of polyethylene (PE) or high density polyethylene (HDPE). As indicated by 124, two sections of the tubing can disconnect, causing the pellets P to spill into open water without reaching the third enclosure 102c. For example, the joined sections of tubing can be disturbed by objects or marine life in the open water surrounding the enclosures 102a-102c. In some cases, movement of ocean waves can also loosen the joints between adjacent sections of tubing. Like the clog 122 in the second feed pipe 110b, the disconnection 124 in the third feed pipe 110c can cause the livestock 104 to miss one or more feeding cycles, thus impeding their growth. Since the pellets P spill into open water, the disconnection 124 can also lead to waste and increased feeding costs. Although FIG. 1 depicts a complete disconnection 124, in some cases, the tubing that forms the feed pipe 110c may include a leak that leads to a partial loss of the pellets P. In this case, some pellets P may arrive in the enclosure 102c, but the overall feed volume is less than intended.

As schematically shown in FIGS. 2 to 5, the controller 114 can control the blower 112 and the dosing system 108 to reduce the likelihood of and detect the issues depicted in FIG. 1. In each case, the controller 114 determines a state of the feeding system 100 and sends instructions to the dosing system 108 and the blower 112 to operate the feeding system 100 in a manner specific to the detected state. The controller 114 can determine the state of the feeding system 100 based on input received via networked communication, one or more input variables associated with the feeding system's equipment, or a combination of both.

For example, the controller 114 may receive networked communications that indicate the state of the feeding system 100. A feeding protocol can be stored on the server 125, which can send a command to the controller 114 based on the time of day, e.g., that a feeding cycle is scheduled to begin. The controller 114 can also receive a command that originates from the user device 127 to place the feeding system 100 in a particular state, e.g., a manual command to initiate a feeding cycle.

The controller 114 can also be configured to determine a state of the feeding system 100 based on signals from the components of the feeding system 100. The controller 114 can be configured to read the blower's power consumption, rotation (e.g., in RPM), flow rate, pressure differential, or backpressure to name a few examples. The controller 114 can be configured to read the dosing system's feed rate in weight per time or volume per time, depending on the design of the dosing system 108.

Based on the determined state of the feeding system 100, the controller 114 sends instructions to the dosing system 108 and the blower 112 to operate the feeding system 100. For example, the controller 114 can send instructions to the dosing system 108 to modify the feed rate. The controller 114 can send instructions to the blower 112 to modify the power consumption, rotation (e.g., in RPM), flow rate, pressure differential, or backpressure. In some states, the controller 114 can send instructions to control further components of the feeding system 100, such as a switch 119 (FIG. 1). The controller 114 can generate instructions automatically. That is, the controller 114 does not require human evaluation or input to determine the operational parameters of the dosing system 108 and the blower 112.

Figure 2:
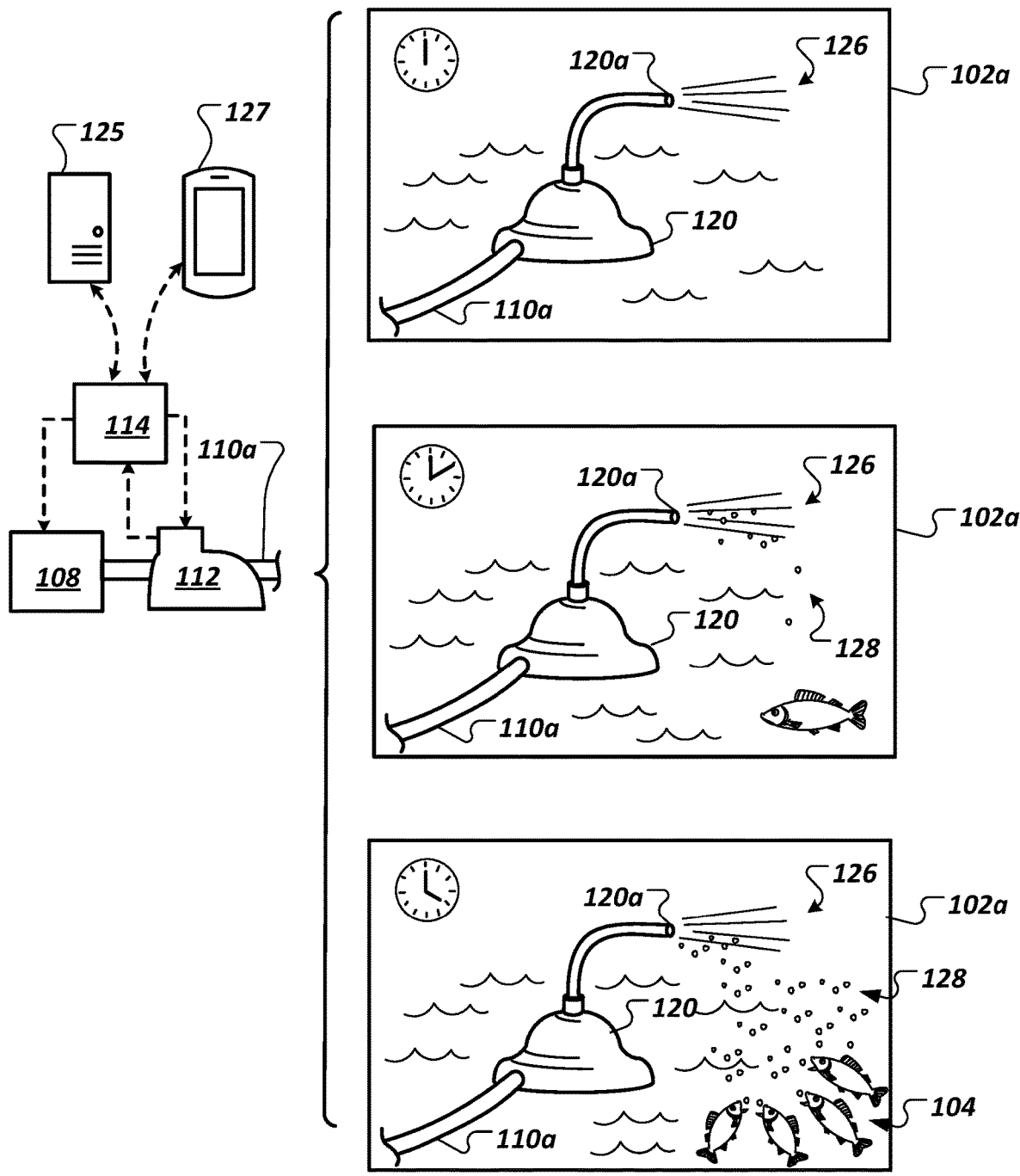
FIGS. 2 to 5 depict various states of the feeding system in FIG. 1 in more detail.

FIG. 2 is a schematic illustration of an enlarged view inside of the first enclosure 102a at a first, a second, and a third time. In the first frame of FIG. 2, the controller 114 determines that the feeding system 100 has transitioned from an inactive to a start-up state, i.e., a feeding cycle is about to begin. The controller 114 can detect the start-up state based on various inputs. For example, the controller 114 can receive information from the server 125 that a scheduled feeding is about to begin. The controller 114 can receive information from the user device 127 or the server 125 to manually trigger the start of feeding. The controller 114 can also detect that the feed rate of the dosing system 108 and the flow rate of the blower 112 is approximately equal to zero. The controller 114 can also detect that the dosing system 108 and the blower 112 are idling or that power to the devices is turned off. In some cases, the controller 114 is configured to determine that the feeding system 100 is in a start-up state based on a combination of these inputs, e.g., networked communication that triggers a feeding cycle in combination with an idling dosing system 108 and blower 112.

At the start of a feeding cycle, the feed pipe 110a is ideally empty or close to empty to prevent sticky feed pellets from accumulating inside of the feed pipe 110a. During an initial period, the controller 114 controls the dosing system 108 so that feed from the feed storage (not shown) does not enter the feed pipe 110a. At the same time, the controller 114 controls the blower 112 to blow air 126 through the feed pipe 110a. Blowing air through the empty or nearly empty feed pipe 110a can clear residual fish oil from earlier feeding cycles and reduce the likelihood that feed pellets from the incoming feed stick to the inner walls of the feed pipe 110a. For example, the controller 114 can set a particular flow rate for the blower 112 while maintaining the feed rate of the dosing system 108 at zero.

The controller 114 can optionally continue to monitor the blower 112 to ensure that a stable and expected backpressure is reached before continuing with the start-up process. Backpressure is a single pressure value that indicates the pressure at an outlet 120a, e.g., of the spreader 120a, and can be monitored to check that the feeding system 100 is operating as expected. In general, backpressure can be measured using a pressure gauge. However, the controller 114 can also estimate the backpressure based on the blower's power consumption. For example, if the backpressure in the first frame of FIG. 2 continues to rise beyond an expected value, the controller 114 may determine that the feed pipe 110a is clogged from past feeding cycles and send a corresponding communication to the server 125 or the user device 127.

After a period of time elapses or after an expected backpressure is detected, the controller 114 can set the feed rate of the dosing system 108 to start a flow 128 of pellets, as shown by the second frame in FIG. 2. The feed rate of the pellets differs based on, e.g., feed type and pellet size. In some cases, a specific feed type is associated with a particular backpressure value that has shown to spread the pellets a desired distance within the enclosure 102a.

The third frame in FIG. 2 depicts the enclosure 102a after further time has elapsed, and the feeding system 100 has transitioned to a fully operational feeding state. In the fully operational feeding state, a continuous stream of air and pellets 126, 128 exits the outlet 120a of the spreader 120. The pellets are distributed across the water surface to allow the livestock 104 to feed on the pellets.

In FIG. 1-5, each enclosure includes a spreader 120 that connects to the end of a respective feed pipe 110a-110c. As shown, the spreader 120 has an outlet 120a positioned above the surface of the water 116 and acts as a canon that shoots pellets across the water surface. However, other implementations of the present disclosure may not include a spreader 120. Instead, an end of the feed pipe 110a-110c may be positioned above or below the surface of the water 116 inside the enclosure 102a-102c using suitable hardware.

Figure 3:
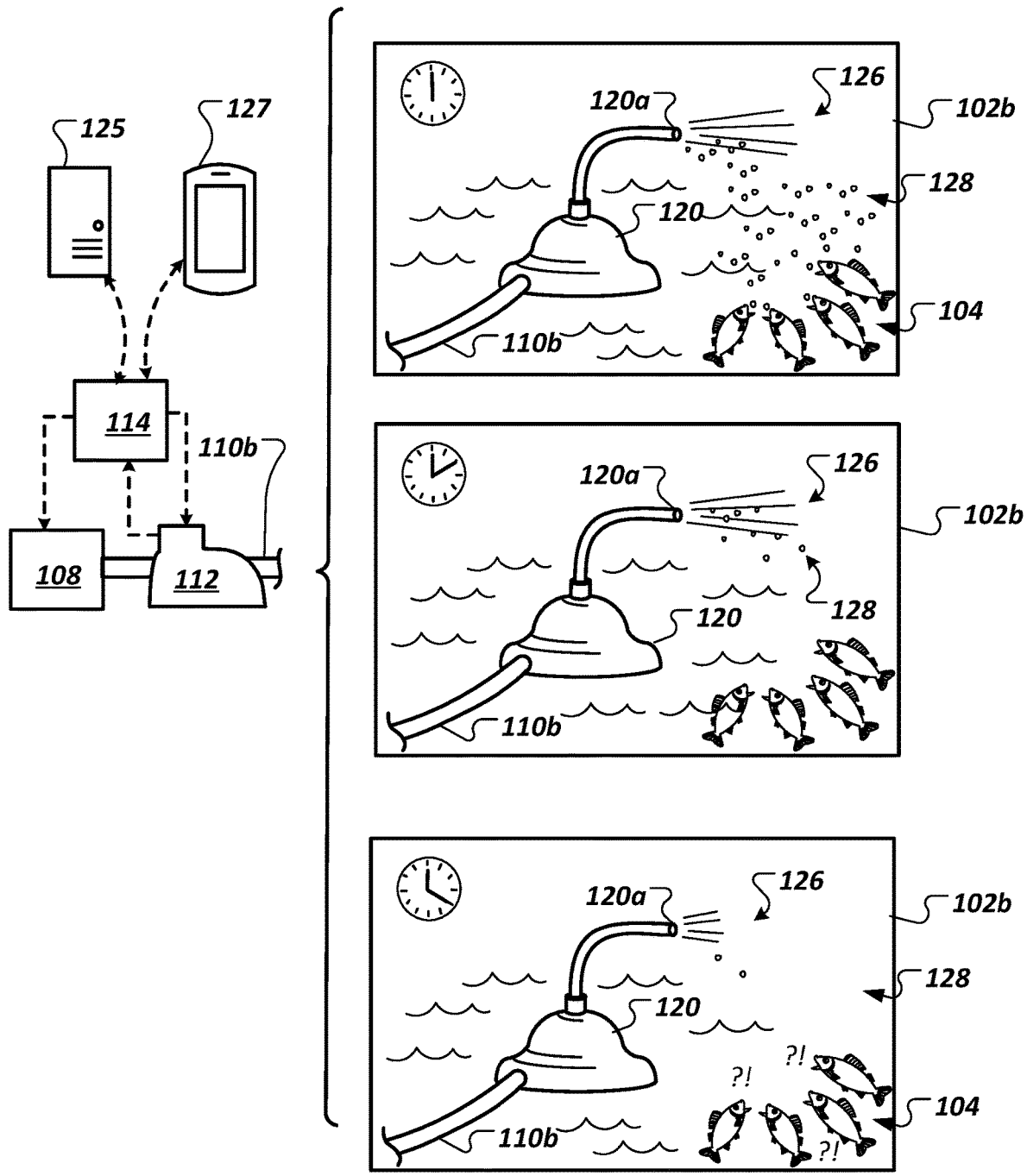

FIG. 3 is a schematic illustration of an enlarged view inside of the second enclosure 102b at a first, a second, and a third time. In the first frame of FIG. 3, the feeding system 100 is in a fully operational feeding state, as also shown in the final frame of FIG. 2. Between the first and the second frames of FIG. 3, the second feed pipe 110b becomes clogged, as shown in FIG. 1. The third frame of FIG. 3 shows the second enclosure 102b as time progresses.

In FIG. 3, the controller 114 detects that the feeding system 100 has transitioned from a normally operating state to a state in which the feed pipe 110b is clogged in the second frame. In some cases, the controller 114 monitors the backpressure via the blower's power consumption during normal operation to determine a confidence interval. As previously described, each type of feed is associated with a specific backpressure value that spreads the pellets a desired distance within the enclosure. The specific backpressure value can be used to determine a confidence interval with respect to the specific value and set upper and lower limits for the backpressure during operation. For example, the confidence interval can be a 95% confidence interval or a 90% confidence interval in some implementations. If the controller 114 detects a backpressure value that is above the upper limit defined by the confidence interval, then the controller 114 may determine that the feed pipe 110b contains a clog.

In some implementations, the controller 114 can monitor changes in the backpressure. During normal operation, the backpressure and the blower's power consumption are relatively stable. If the values increase, the controller 114 may determine that the feed pipe 110b contains a clog.

After the controller 114 determines that the feeding system 100 is in a clogged state, the controller 114 can send instructions to the dosing system 108 and the blower 112 that are specific to the clogged state. For example, the controller 114 can send instructions that shut off the dosing system 108 and blower 112 to avoid damage to the components. In some cases, the shut off may be abrupt, while in other cases, the dosing system's feed rate and the blower's flow rate may ramp down over a set period of time. The third and final frame of FIG. 3 shows that once the clog in the second feed pipe 110b has been detected and the controller 114 has instructed the dosing system 108 and the blower 112 accordingly, the stream of air 126 and the stream of feed 128 that exits the outlet 120a of the spreader 120 is diminished when compared to the two prior frames of FIG. 3.

The controller 114 can also send a message to the server 125 or the user device 127 that indicates that a clog has been detected in the second feed pipe 110b connected to the second enclosure 102b.

Figure 4:
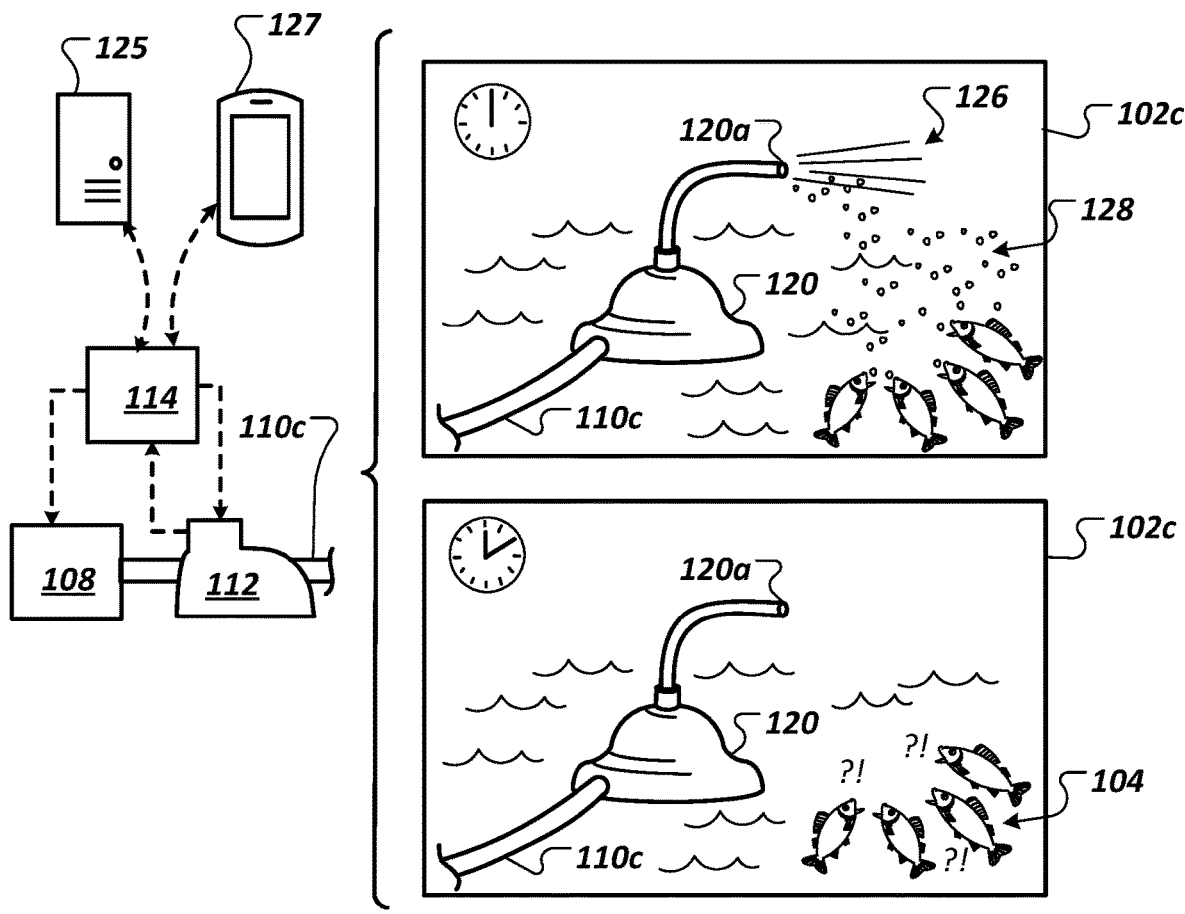

FIG. 4 is a schematic illustration of an enlarged view inside of the third enclosure 102c at two different times. In the first frame of FIG. 4, the feeding system 100 is in a fully operational feeding state, as also shown in the final frame of FIG. 2 and the first frame of FIG. 3. Between the first and the second frames of FIG. 4, the third feed pipe 110c becomes disconnected, as shown in FIG. 1.

In FIG. 4, the controller 114 detects that the feeding system 100 has transitioned from a normally operating state to a state in which the feed pipe 110c has disconnected. As previously described, the controller 114 can monitor the backpressure in the feed pipe 110c via the blower's power consumption and set a confidence interval relative to an expected backpressure value. If the controller 114 detects a backpressure value that is below the lower limit defined by the confidence interval, then the controller 114 may determine that the feed pipe 110c has been disconnected. Alternatively or additionally, the controller 114 can monitor changes in the backpressure, i.e., a decrease in stable power consumption values can indicate a drop in backpressure and a disconnection in the feed pipe 110c.

In some implementations, the controller 114 can estimate a location of the disconnection based on the drop in backpressure (power consumption). For instance, a large reduction in backpressure generally indicates a disconnection closer to the blower, while a smaller reduction in backpressure indicates a disconnection closer to the enclosure 102c.

After the controller 114 determines that the feeding system 100 is in a clogged state, the controller 114 can send a message to the server 125 or the user device 127 that indicates that a disconnection in the feed pipe 110c has been detected. If available, the message can include the approximate location of the disconnection along the feed pipe. The controller 114 can also send instructions to the dosing system 108 and the blower 112 that are specific to the disconnected state. For example, the controller 114 can send instructions that shut off the dosing system 108 and the blower 112 to avoid wasting feed pellets that would otherwise land in open water. As in FIG. 3, the shut off may be gradual or abrupt. The second frame in FIG. 4 shows that once the disconnection in the feed pipe 110c has been detected and the controller 114 has instructed the dosing system 108 and the blower 112 accordingly, air and feed no longer exit the from the outlet 120a of the spreader 120.

Figure 5:
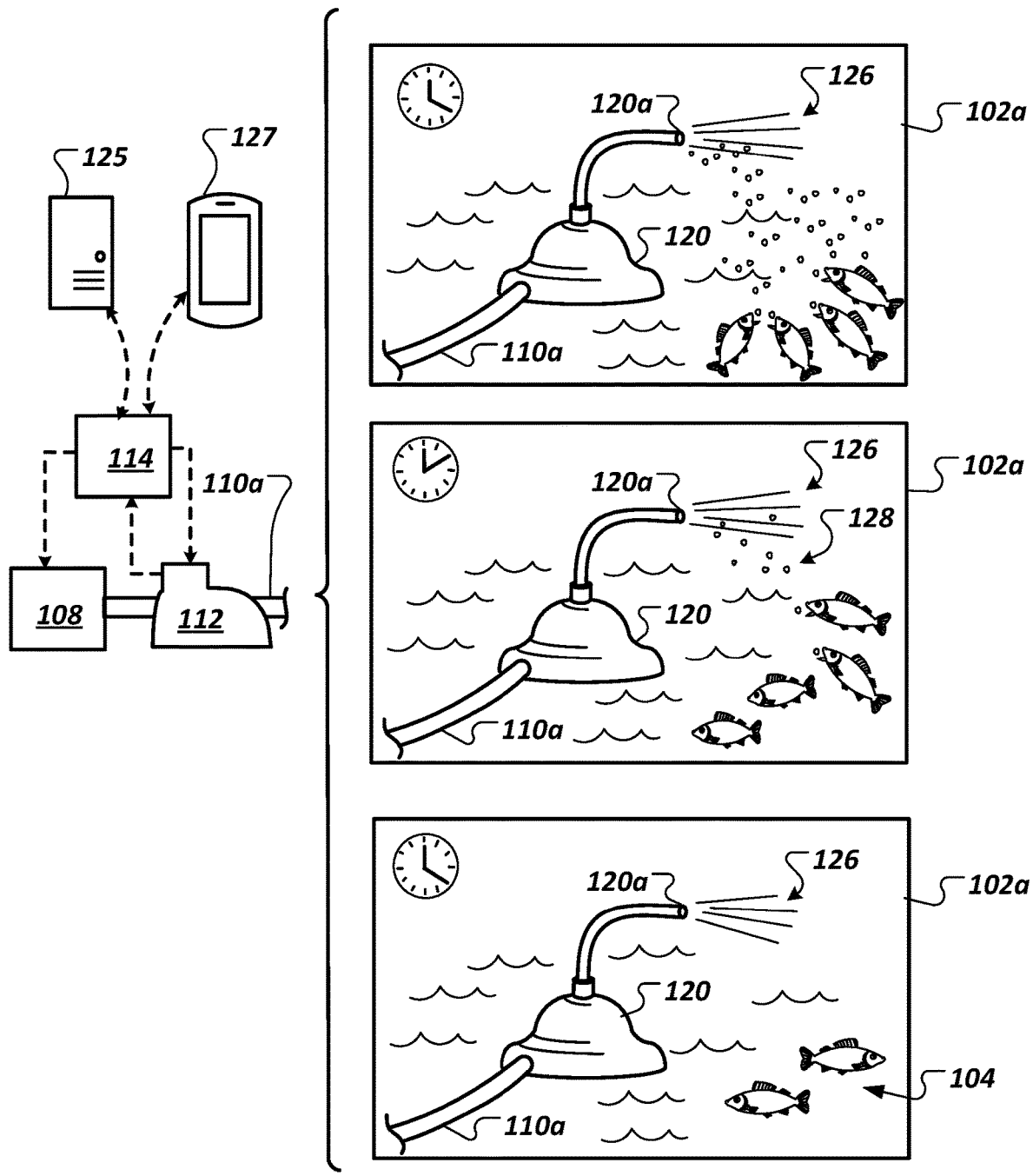

FIG. 5 is a schematic illustration of an enlarged view inside of the first enclosure 102a at three different times. In the first frame of FIG. 5, the feeding system 100 is in a fully operational feeding state, as also shown in the final frame of FIG. 2, the first frame of FIG. 3, and the first frame of FIG. 4. Between the first and the second frames of FIG. 5, the feeding system 100 transitions to a ramp-down state. The third frame of FIG. 5 shows the first enclosure 102a as time progresses.

In FIG. 5, the controller 114 detects that the feeding system 100 has transitioned to a ramp-down state, i.e., a feeding cycle in the present enclosure is about to end. The controller 114 can determine the transition to the ramp-down state based on various inputs. For example, the controller 114 can receive information from a server 125 that a scheduled feeding is about to end. The controller 114 can receive information from a user device 127 or the server 125 that manually ends the feeding cycle. Finally, the controller 114 can determine that feeding is about to end based on the time elapsed since the start of feeding.

After determining that the feeding system 100 is in a ramp-down state, the controller 114 sends instructions to the dosing system 108 and the blower 112 to operate the feeding system 100. For example, in the second frame of FIG. 5, the controller 114 can begin to taper, i.e., gradually decrease the feed rate of the dosing system 108 while maintaining the flow rate and backpressure of the blower 112 at a constant rate. As previously described, the feed pipe 110a is ideally as empty as possible between feeding cycles to reduce the accumulation of sticky pellets inside the feed pipe 110a. By maintaining the flow rate and backpressure of the air, the feeding system 100 can evacuate the remaining feed pellets more efficiently.

Finally, as shown in the third frame of FIG. 5, the controller 114 can operate the blower 112 to blow air through the feed pipe 110a after the dosing system 108 has stopped providing pellets to the feed pipe 110a. After the state shown in the third frame, the controller 114 can shut off the dosing system 108 and the blower 112. However, in some implementations, the dosing system 108 and blower 112 can remain on. The controller 114 can operate the switch 119 (FIG. 1) to couple a different section of feed pipe to the same dosing system 108 and blower 112 and repeat the process depicted in FIG. 2.

Although FIGS. 1 to 5 are depicted with blower 112, in some implementations, the blower 112 may be blower-compressor devices that pressurize the air flowing through the feed pipes 110a-110d.

In some implementations, the feeding system 100 is anchored to a structure such as a pier, dock, or buoy. For example, instead of being confined within the enclosures 102a-102c, the livestock 104 can be free to roam a body of water, and the feeding system 100 can use feed pipes to distribute the feed across a certain area of the body of water.

Figure 6:
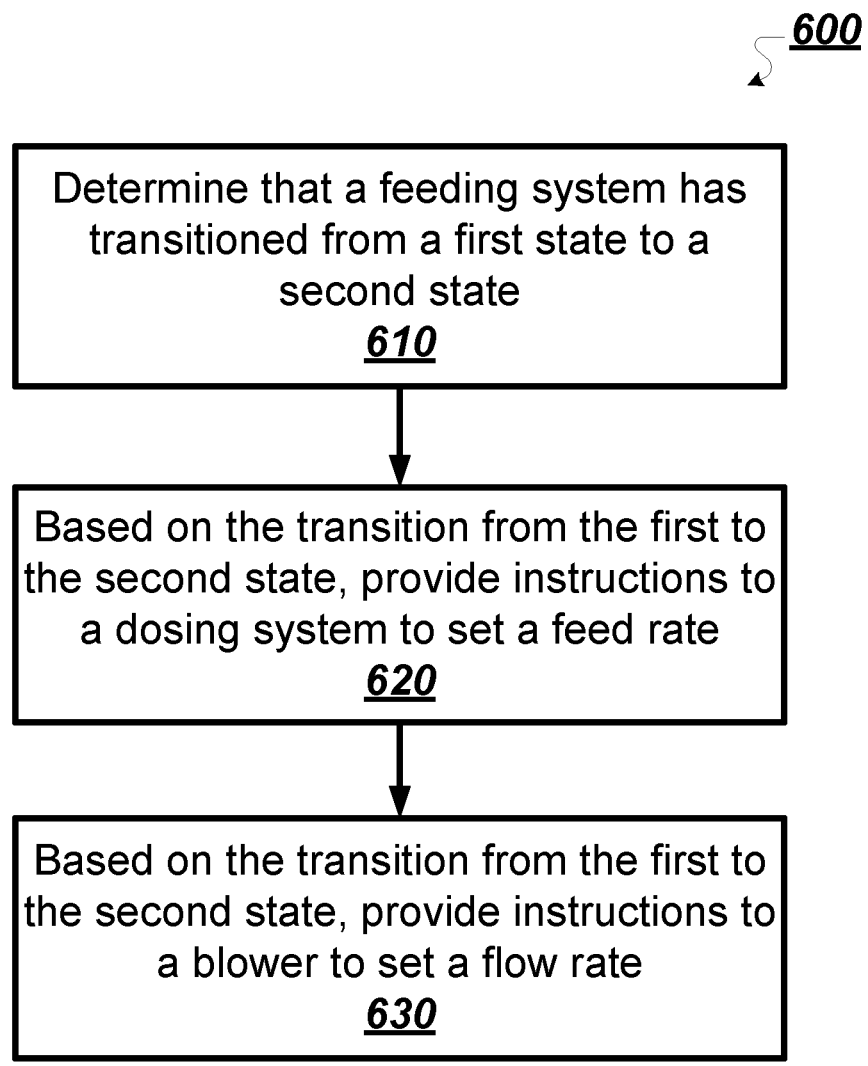
FIG. 6 is a flow diagram for an example process of controlling a feeding system.

FIG. 6 is a flow diagram for an example process 600 for controlling a feeding system. The example process 600 may be performed by various systems, including the feeding system 100 of FIG. 1. For example, the process 600 may be performed by the controller 114 described in relation to FIGS. 1 to 5.

The process 600 includes determining, using a feeding system controller, that a feeding system has transitioned from a first state to a second state (610). For example, the controller may determine that the feeding system has transitioned from the first state to the second state by receiving information over a network that indicates the transition. The information can include information stored on a server (e.g. a feeding schedule or protocol) or a message sent from a user device.

In some implementations, determining that the feeding system has transitioned from the first state to the second includes detecting a change in backpressure at one end of a feed pipe that is connected at its opposite end to the blower. In some cases, the backpressure is determined based on information that indicates a power consumption of the blower. For example, the change in backpressure can be detected by determining a confidence interval relative to a predetermined backpressure value, determining an upper limit and a lower limit for the backpressure based on the confidence interval, and comparing a detected backpressure value to the upper limit or the lower limit.

The process 600 includes, based on the transition from the first to the second state, providing instructions to a dosing system to set a feed rate of the dosing system using the feeding system controller (620). The process 600 includes, based on the transition from the first to the second state, providing instructions to a blower operatively coupled to the dosing system to set a flow rate of the blower using the feeding system controller (620).

For example, the first state can be an idle state, and the second state can be a feeding state. Providing instructions to the dosing system to set the feed rate of the dosing system can include setting the feed rate to zero over a period of time, and providing instructions to the blower to set the flow rate of the blower can include setting the flow rate to a non-zero value over the same period of time. In some cases, the non-zero value of the flow rate can increase over the period of time. Thus, the feeding system can clear residue and debris from feed pipes before a feeding cycle commences.

For example, the first state can be a feeding state, and the second state can be an idle state. Providing instructions to the dosing system to set the feed rate of the dosing system can include tapering the feed rate to zero over a period of time, and providing instructions to the blower to set the flow rate of the blower can include maintaining the flow rate at a non-zero value over the same period of time. Thus, the feeding system can ensure that little or no residue or feed remains in the feed pipes before the feeding cycle ends.

For example, the first state can be a feeding state, and the second state can be a clogged state detected through an increase in backpressure. In response to detecting the increase in backpressure, the process 200 can include providing instructions to the dosing system to set the feed rate of the dosing system to zero and providing instructions to the blower to set the flow rate of the blower to zero. Thus, the feeding system can prevent feed from backing up the feeding system and potentially damaging the components. In some implementations, the process 200 can include notifying an overseer of the clogged state via the wireless network.

For example, the first state can be a feeding state, and the second state can be a disconnected state detected through a decrease in backpressure. In response to detecting the decrease in backpressure, the process 200 can include providing instructions to the dosing system to set the feed rate of the dosing system to zero. Thus, the feeding system can reduce feed waste. In some implementations, the process 200 can maintain the flow rate of the blower at a non-zero value to flush residual feed from the system and prevent future clogging. In some cases, the process 200 can include notifying an overseer of the disconnected state via the wireless network.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A system comprising:
   one or more computers and one or more storage devices storing instructions that are operable, when executed by the one or more computers, to cause the one or more computers to perform operations comprising:
   determining that an aquaculture feeding system has transitioned from a first state to a second state based on detecting a change in backpressure at an outlet at an end of a feed pipe that is connected to a blower at an opposite end, wherein the outlet is positioned above water surface, and wherein detecting the change in backpressure comprises:
   determining a current power consumption of the blower blowing air through the feed pipe, and
   detecting the change in backpressure based on determining that a difference between the current power consumption and a predetermined value of power consumption is above a threshold; and
   responsive to determining that the aquaculture feeding system has transitioned from the first to the second state:
   providing instructions to a dosing system that transfers feed pellets into the feed pipe to set a feed rate of the dosing system; and
   providing instructions to the blower that is operatively coupled to the dosing system and that moves the feed pellets along the feed pipe, to set a flow rate of the blower.

2. The system of claim 1,
   wherein determining that the feeding system has transitioned from the first state to the second state comprises receiving information that indicates the transition over a network.

3. The system of claim 2,
   wherein the first state is an idle state and the second state is a feeding state,
   wherein providing instructions to the dosing system to set the feed rate of the dosing system comprises setting the feed rate to zero over a period of time, and
   wherein providing instructions to the blower to set the flow rate of the blower comprises setting the flow rate to a non-zero value over the same period of time.

4. The system of claim 2,
   wherein the first state is a feeding state and the second state is an idle state,
   wherein providing instructions to the dosing system to set the feed rate of the dosing system comprises tapering the feed rate to zero over a period of time, and
   wherein providing instructions to the blower to set the flow rate of the blower comprises maintaining the flow rate at a non-zero value over the same period of time.

5. The system of claim 1, wherein detecting the change in backpressure comprises:
   determining a confidence interval relative to a predetermined backpressure value;
   determining an upper limit and a lower limit for the backpressure based on the confidence interval; and
   comparing a detected backpressure value to the upper limit or the lower limit.

6. The system of claim 1, wherein the operations further comprise:
   in response to detecting an increase in backpressure, providing instructions to the dosing system to set the feed rate of the dosing system to zero and providing instructions to the blower to set the flow rate of the blower to zero.

7. The system of claim 1, wherein the operations further comprise:
   in response to detecting a decrease in backpressure, providing instructions to the dosing system to set the feed rate of the dosing system to zero.

8. A computer-readable storage device encoded with a computer program, the program comprising instructions that when executed by one or more computers cause the one or more computers to perform operations comprising:
   determining that an aquaculture feeding system has transitioned from a first state to a second state based on detecting a change in backpressure at an outlet at an end of a feed pipe that is connected to a blower at an opposite end, wherein the outlet is positioned above water surface, and wherein detecting the change in backpressure comprises:

determining a current power consumption of the blower blowing air through the feed pipe, detecting the change in backpressure based on determining that a difference between the current power consumption and a predetermined value of power consumption is above a threshold; and responsive to determining that the aquaculture feeding system has transitioned from the first to the second state:

providing instructions to a dosing system that transfers feed pellets into the feed pipe to set a feed rate of the dosing system; and providing instructions to the blower that is operatively coupled to the dosing system and that moves the feed pellets along the feed pipe, to set a flow rate of the blower.

9. A method comprising:

determining that an aquaculture feeding system has transitioned from a first state to a second state based on detecting a change in backpressure at an outlet at an end of a feed pipe that is connected to a blower at an opposite end, wherein the outlet is positioned above water surface, and wherein detecting the change in backpressure comprises:

determining a current power consumption of the blower blowing air through the feed pipe, detecting the change in backpressure based on determining that a difference between the current power consumption and a predetermined value of power consumption is above a threshold; and responsive to determining that the aquaculture feeding system has transitioned from the first to the second state:

providing instructions to a dosing system that transfers feed pellets into the feed pipe to set a feed rate of the dosing system; and providing instructions to the blower that is operatively coupled to the dosing system and that moves the feed pellets along the feed pipe, to set a flow rate of the blower.

10. The method of claim 9, wherein determining that the feeding system has transitioned from the first state to the second state comprises receiving information over a network that indicates the transition.

11. The method of claim 10, wherein the first state is an idle state and the second state is a feeding state, wherein providing instructions to the dosing system to set the feed rate of the dosing system comprises setting the feed rate to zero over a period of time, and wherein providing instructions to the blower to set the flow rate of the blower comprises setting the flow rate to a non-zero value over the same period of time.

12. The method of claim 10, wherein the first state is a feeding state and the second state is an idle state, wherein providing instructions to the dosing system to set the feed rate of the dosing system comprises tapering the feed rate to zero over a period of time, and wherein providing instructions to the blower to set the flow rate of the blower comprises maintaining the flow rate at a non-zero value over the same period of time.

13. The method of claim 9, wherein detecting the change in backpressure comprises:

determining a confidence interval relative to a predetermined backpressure value;

determining an upper limit and a lower limit for the backpressure based on the confidence interval; and comparing a detected backpressure value to the upper limit or the lower limit.

14. The method of claim 9, comprising in response to detecting an increase in backpressure, providing instructions to the dosing system to set the feed rate of the dosing system to zero and providing instructions to the blower to set the flow rate of the blower to zero.

15. The method of claim 9, comprising in response to detecting a decrease in backpressure, providing instructions to the dosing system to set the feed rate of the dosing system to zero.

* * * * *